United States Patent Office 3,051,024
Patented Aug. 28, 1962

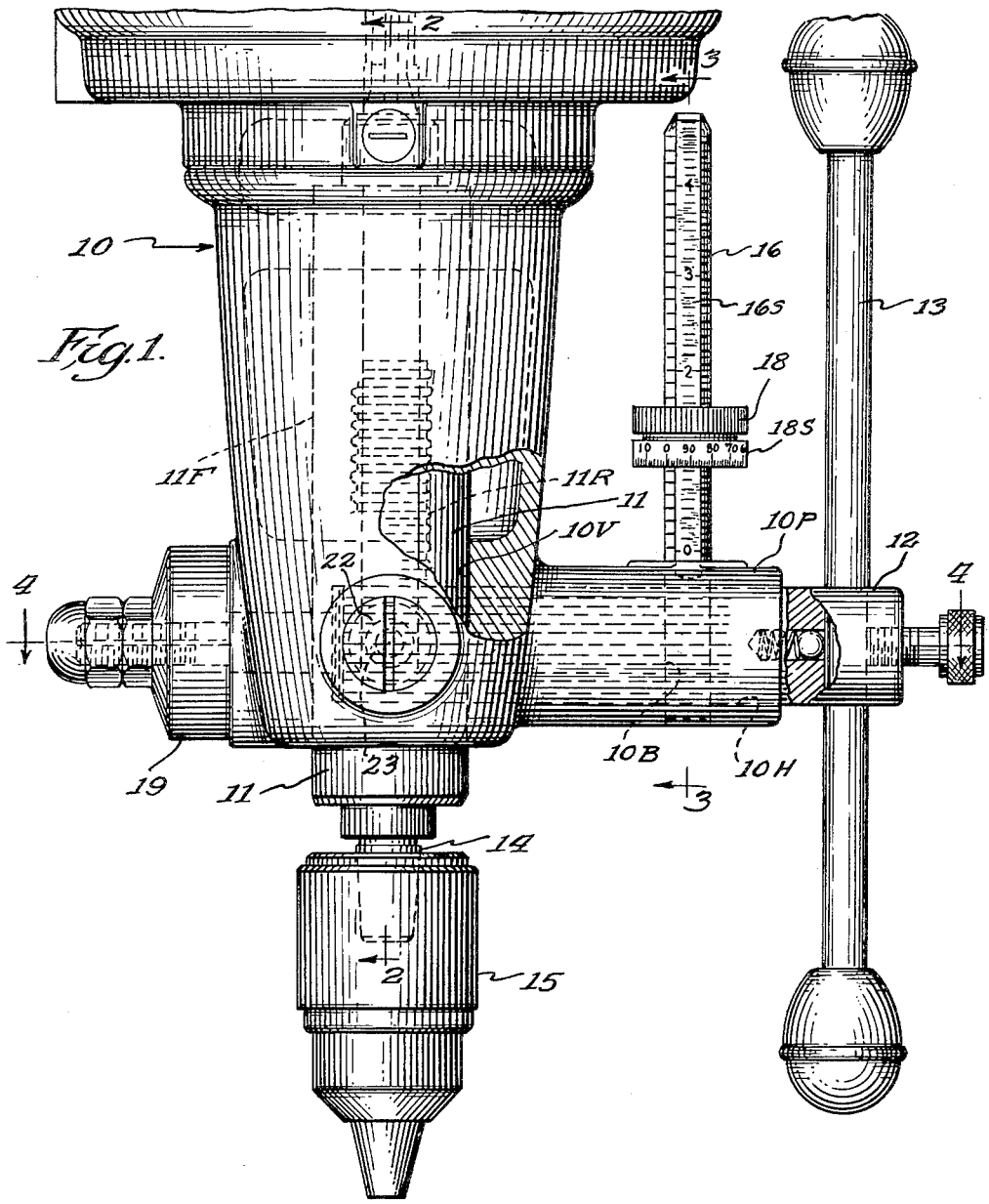

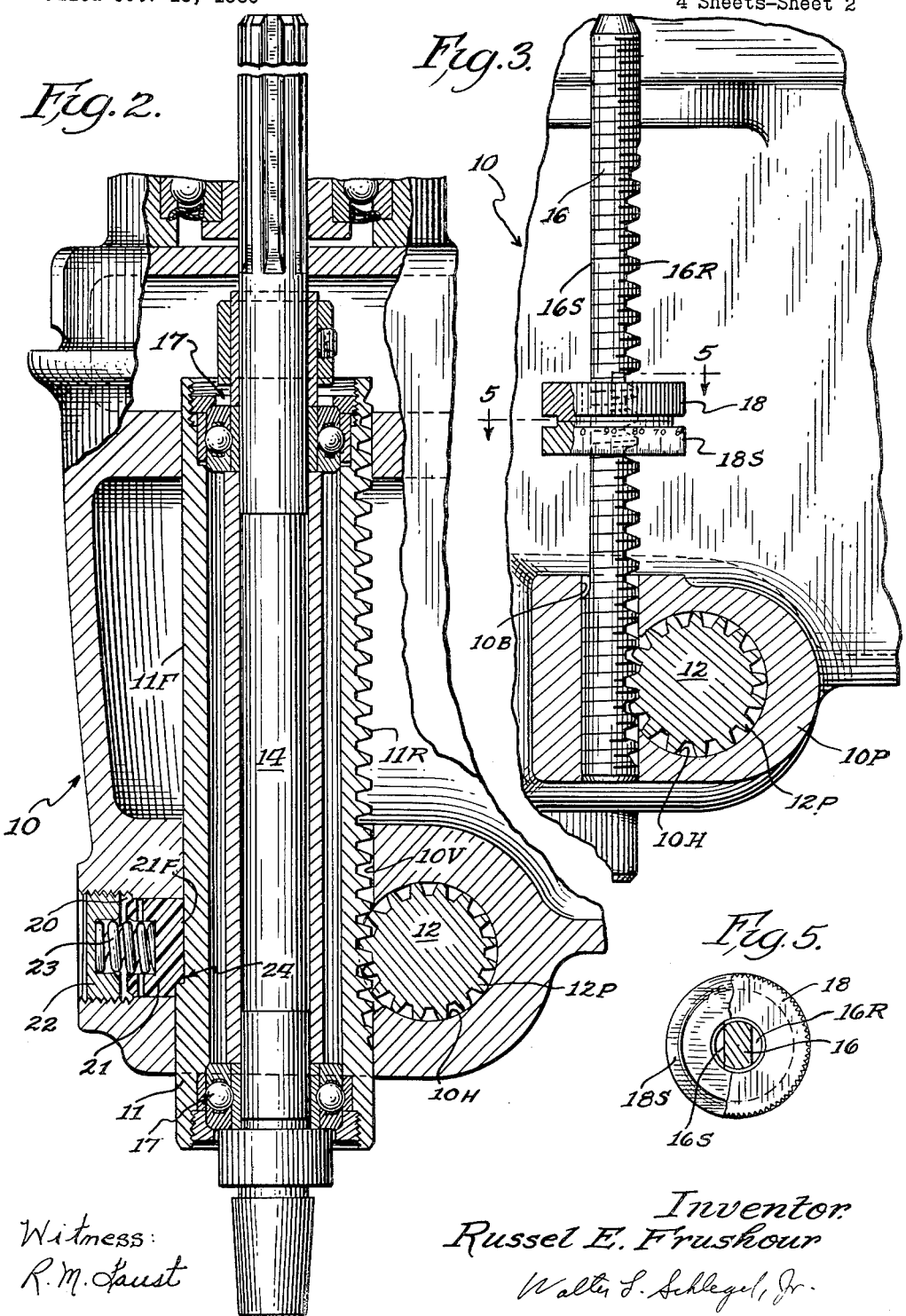

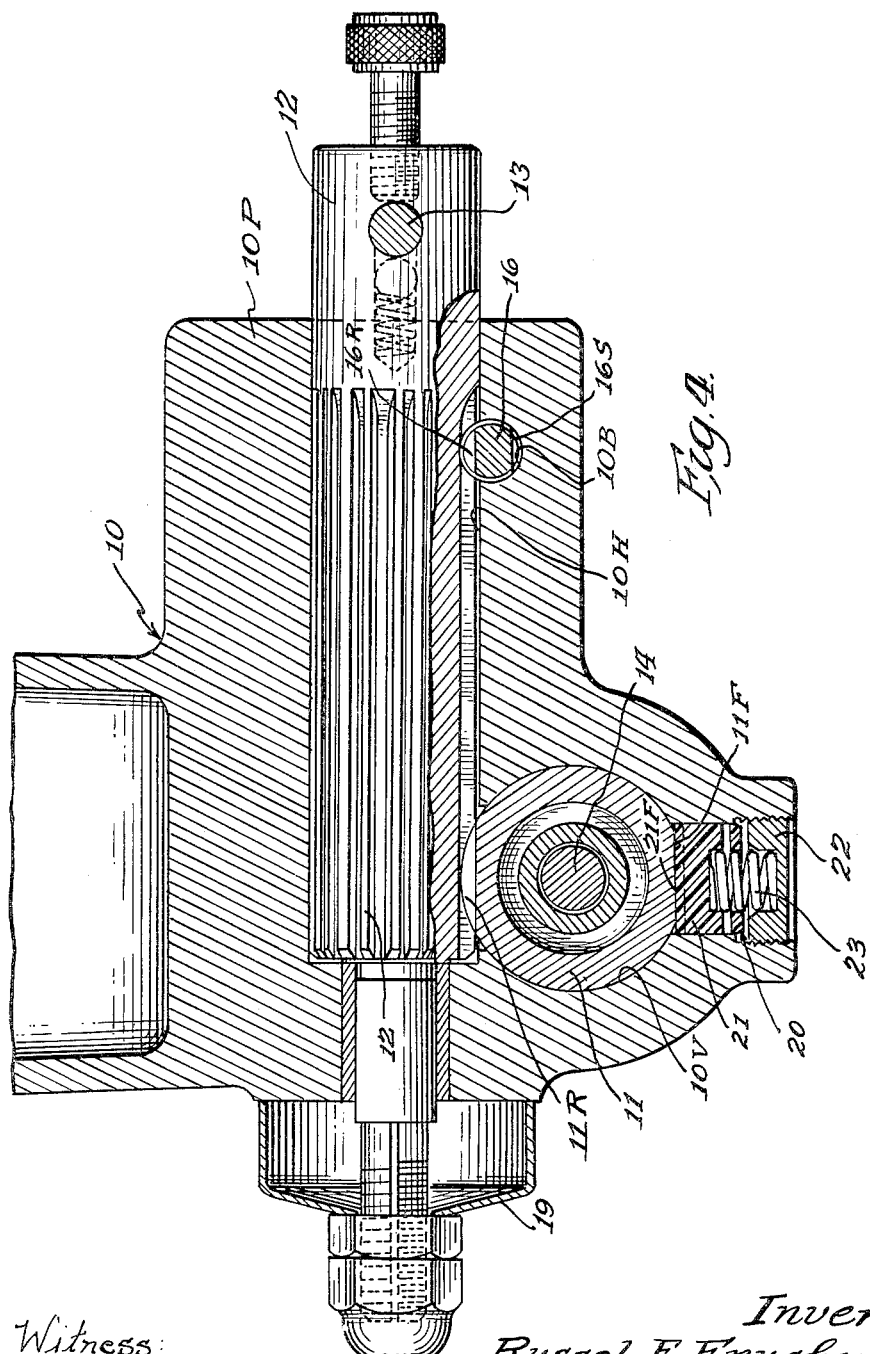

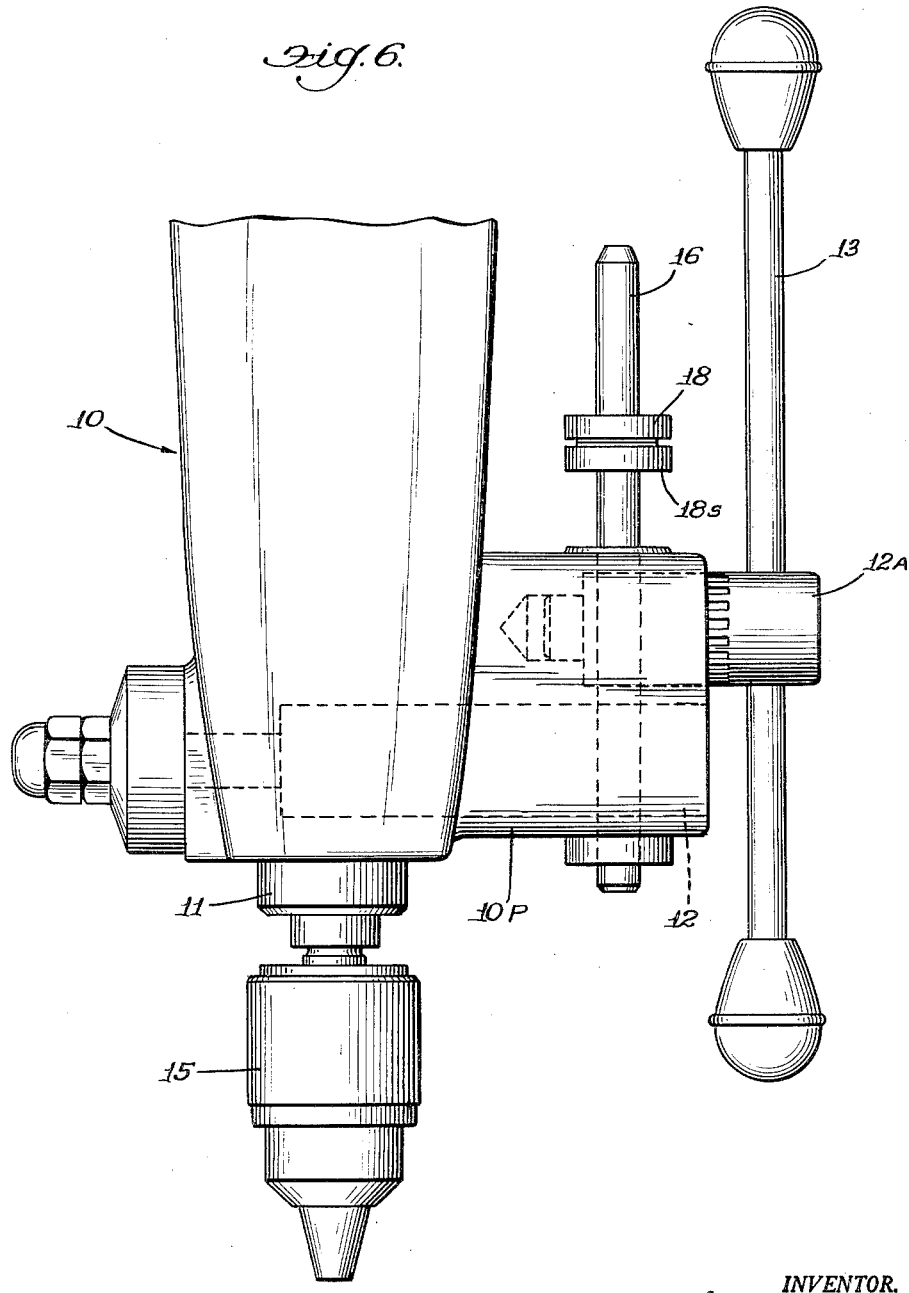

3,051,024
DRILL PRESSES
Russel E. Frushour, Niles, Mich., assignor to Amsted Industries Incorporated, Chicago, Ill., a corporation of New Jersey
Filed Oct. 19, 1960, Ser. No. 63,577
19 Claims. (Cl. 77—34.5)

This invention relates to drill presses and, more particularly, is concerned with improving the accuracy and ease of the drilling operation. This application is a continuation-in-part of my copending application, Serial No. 721,456, filed March 14, 1958, now abandoned.

The present invention has for its principal object the provision of a novel depth-gage rod and quill arrangement for controlling the positioning of the rotatably driven drill press spindle for attaining high precision in drilling operations, particularly in those drilling operations wherein the depth-gage rod is active for limiting the downward travel of the quill and spindle.

Other objects and advantages will become apparent during the course of the following description.

In the accompanying drawings forming a part of this specification and in which like numerals are employed to designate like parts throughout the same;

FIGURE 1 is a fragmentary front-elevational view of a drill press head assembly constructed in accordance with the present invention, with parts of the head casting thereof broken away for purposes of illustration;

FIGURE 2 is a detailed sectional view taken on line 2—2 of FIG. 1 and illustrating the novel quill of the invention;

FIGURE 3 is a detailed sectional view taken on line 3—3 of FIG. 1, and illustrating the novel depth-gage rod of the invention;

FIGURE 4 is a detailed sectional view taken on line 4—4 of FIG. 1 and illustrating the feed shaft for the quill and depth-gage rod;

FIGURE 5 is a fragmentary detailed sectional view taken on line 5—5 of FIGURE 3; and FIGURE 6 is a view similar to FIGURE 1 illustrating an alternate embodiment of the invention.

Referring now to the drawings and particularly to FIGURE 1 thereof, for purpoess of disclosure, the invention is shown embodied in a drill press having a head 10 in which a quill 11 is vertically slidable under the control of a rotatably mounted quill-feed shaft 12 that is provided with an operating handle 13 for varying the vertical positioning of a spindle 14 that is rotatably carried in the quill 11 and movable vertically therewith. The lower end of the spindle may receive any suitable form of chuck 15.

The arrangement is shown as including a depth-gage rod 16 for limiting the movement of the quill to a predetermined extent, thereby determining the depth of the holes to be drilled. In the past, the depth-gage rod has included a lower end portion adjacent to and fixed to the lower end of the quill, and when the rod reached its preselected end point of travel, it held the quill against further vertical movement; however, it was still possible to apply further downward pressure on the quill through the quill-feed shaft and such pressures tended to set up a lateral deflection of the end of the quill and, hence, of the point of the drill. This deflection, of course, destroyed the accuracy of the drilling operation.

In accordance with the present invention, however, the feed shaft 12 is in driving engagement with both the quill 11 and the depth-gage rod 16, and when the depth-gage rod reaches its pre-set limit of movement, it holds the feed shaft against further rotation and hence limits the downward movement of the quill, but without setting up any lateral deflection of the quill or the drill point.

In the illustrated embodiment, the head 10 is in the form of a chambered casting having a central vertical bore 10V for receiving the quill 11 in accurately guided, vertically slidable relation. This casting includes an enlarged protuberance 10P which is formed with a vertical guide bore 10B (see FIGURE 3) in which the depth-gage rod 16 is received in vertically slidable relation. A horizontal bore 10H is formed to extend through the main part of the head casting and through the protuberance to intersect and communicate with the vertical bores 10V and 10B adjacent the rearmost sides thereof, which are arranged in substantially coplanar relation.

As shown in FIGURE 2, the quill 11 is provided internally thereof with suitable anti-friction bearing facilities 17 in which the spindle is journalled in a conventional manner to accommodate relative rotation of the spindle in the quill while preventing relative sliding movement therebetween. The rear face of the quill is machined to provide a set of vertically arranged rack teeth 11R while the front face of the quill, as shown at 11F, is flat.

Similarly, the rear face of the depth-gage rod 16 is machined to provide a set of vertically arranged rack teeth 16R, while the front face 16S is flat and is formed with suitable indicia to define a scale. The depth-gage rod is threaded to receive a pair of nuts 18 and 18S in selectively adjustable relation thereon, with the lower nut 18S carrying a vernier scale and being arranged to abut against the upper surface of the protuberance 10P to limit downward travel of the rod 16.

The quill-feed shaft 12 is rotatably journalled in the bore 10H and is formed with axially elongated pinion teeth 12P for meshing simultaneously with the rack teeth of the quill and the depth-gage rod to establish positive driving engagement therewith.

It will be apparent, therefore, that when a hole of predetermined depth is to be drilled, the stop nuts 18 and 18S will be appropriately positioned along the length of the depth-gage rod 16, and as the handle 13 for the feed shaft 12 is actuated to rotate this shaft, the quill 11 and depth-gage rod 16 will move in unison until the stop nut 18S engages the protuberance 10P to prevent further rotation of the feed shaft 12 and thereby to prevent further lowering of the quill 11 and its associated spindle 14, chuck 15, and drill point (not shown). With this arrangement, no lateral deflection of the quill can occur and high-precision drilling may be carried out in a facile and accurate manner.

An alternate embodiment of the invention is illustrated in FIGURE 6 wherein, as in the preferred embodiment, a quill 11 is vertically slidable under the control of a rotatably mounted quill-feed shaft 12. The arrangement also includes a depth-gage rod 16 for limiting the movement of the quill and thereby determining the depth of the holes to be drilled. In the embodiment of FIGURE 6, however, there is provided a splined auxiliary feed or drive shaft 12A which is mounted for rotation in the head 10. The shaft 12A is in driving engagement with the depth-gage rod 16 which is also in driving engagement with the shaft 12. When the shaft 12A is rotated by means of the handle 13, the depth-gage rod 16 is moved downwardly. Downward movement of rod 16 rotates shaft 12 which in turn is in driving engagement with quill 11. When the depth-gage rod reaches its pre-set movement it holds shafts 12 and 12A against further rotation and therefore limits the downward movement of the quill, but without building up any lateral forces in the quill. Deflections of the quill therefore cannot occur and the accuracy of the drilling operation is preserved.

As a further feature, the invention provides an improved arrangement for guiding the vertical movement of the quill and, as is apparent in FIG. 4, the usual spiral return spring may be omitted from the cut 19 that is telescoped over the remote end of the feed shaft. Such springs have been used to automatically retract the quill assembly upwardly into the head casting after the handle 13 for the feed shaft 12 is released.

In non-production machine shops, there are many uses for drill presses where automatic retraction of the quill is undesirable. The operator may want to bring the drill bit down to the work and have it remain there. If the drill press has a spring return, the instant the operator releases the operating handle, the quill and spindle fly back. To prevent this, the operator must use one hand to hold the spindle while the other hand is used for actuating a locking device for the spindle.

In the drill press head of the present invention, the head casting is formed with an open pocket 20 that communicates with the front side of the vertical bore 10V and receives a nylon shoe 21 having a flat face 21F for engagement with the flat face 11F of the quill. A screw 22 is received in the pocket in adjustable threaded engagement with the head, with a compression spring 23 reacting between the screw 22 and shoe 21 to urge the shoe into engagement against the quill. The screw 22 may be adjusted to vary the loading on the shoe 21 as desired. The flat faced engagement between the shoe and the quill opposes any tendency of the quill to rotate within its bore 10V. The shoe 21 is of nylon or similar material having a self-lubricating quality inasmuch as this arrangement permits the shoe to load the quill laterally for taking up such wear as may occur and maintaining accurate positive driving engagement with the feed shaft, without, however, setting up undesired frictional resistance to vertical sliding movement of the quill 11 through the bore 10V. The loading of the shoe is preferably adjusted to a value sufficient to maintain the quill in the position in which it is placed by the operator until such time as the operator again actuates the handle 13.

If the drill press is to be used for a production shop where automatic return is desired, a spring may be provided in the cup 19 and the loading of the nylon shoe reduced sufficiently to allow the spring to raise the spindle automatically. The lubric character of the shoe permits this action while the shoe simultaneously loads the quill laterally for taking up wear and maintaining driving engagement. Upward movement of the quill and spindle is limited by shouldered engagement as at 24 between the shoe 21 and quill 11.

I claim:

1. In a drill press, a drill press head, a quill linearly shiftable in said head, a spindle rotatably mounted in said quill and movable linearly therewith, a depth-gage rod mounted on said head for linear shifting movement and carrying adjustable stop means for abutment with said head to limit downward shifting movement of said rod, and a feed shaft for said quill rotatably mounted in said head in simultaneous positive driving engagement with both said quill and said rod for shifting said quill and said rod in unison.

2. In a drill press head of the type having a quill vertically shiftable therein, a spindle rotatably mounted in said quill and movable vertically therewith, a depth-gage rod mounted for vertical shifting movement through said head and carrying vertically adjustable stop means for abutment with said head to limit downward shifting movement of said rod, and a feed shaft rotatably mounted in said head in driving engagement with said quill, the improvement wherein said rod is mounted in said head at a point adjacent to said feed shaft, said rod including vertical rack teeth, and said feed shaft including pinion teeth in direct intermeshing engagement with said rack teeth.

3. In a drill press, a chambered head casting, said casting being formed with a vertical central guide bore and including a laterally projecting protuberance having a vertical secondary guide bore, said casting and protuberance having a common horizontal guide bore intersecting and communicating with said vertical bores across generally coplanar sides thereof, a quill vertically shiftable in said central vertical bore and including vertically arranged rack teeth along the side thereof adjacent said horizontal bore, a spindle rotatably mounted in said quill and movable vertically therewith, a depth-gage rod vertically shiftable in said vertical secondary bore and including vertically arranged rack teeth along the side thereof adjacent said horizontal bore, and a feed shaft rotatably mounted in said horizontal bore and having pinion teeth meshing simultaneously with the rack teeth of both said quill and said rod.

4. The arrangement of claim 3 wherein said quill has a flat face extending vertically therealong and said head casting is formed with an open pocket communicating with said central vertical bore adjacent the flat face of said quill, a clamping shoe of lubric material and having a flat face is disposed in said pocket, a screw is in said pocket in adjustable threaded engagement with said head, and a compression spring reacts between said shoe and screw to urge the flat face of said shoe against the flat face of said quill.

5. In a drill press, a chambered head casting, said casting being formed with a vertical central guide bore, said casting having a horizontal guide bore intersecting said central guide bore and communicating therewith across the rearmost side thereof, a quill vertically shiftable in said central bore and including vertically arranged rack teeth along the rear side thereof, a spindle rotatably mounted in said quill and movable vertically therewith, a feed shaft rotatably mounted in said horizontal bore and having pinion teeth meshing with the rack teeth of said quill, said quill having a flat face extending vertically along the front side thereof in a plane parallel to the plane of said rack teeth, said head having an open pocket at the front thereof communicating with said central bore at a point adjacent the flat face of said quill, a clamping shoe of lubric material disposed in said pocket and having a flat face facing the flat face of said quill, an adjustable screw in said pocket in threaded engagement with said head, and a compression spring reacting between said shoe and screw to urge the flat face of said shoe against the flat face of said quill.

6. In a drill press head of the type having a quill vertically shiftable therein, a spindle rotatably mounted in said quill and movable vertically therewith, and a feed shaft rotatably mounted in said head in driving engagement with said quill for shifting the same vertically, the improvement wherein said quill has a flat surface extending vertically along one side thereof, said head has an open pocket adjacent the flat face of said quill, a clamping shoe of lubric material disposed in said pocket and having a flat face facing the flat face of said quill, an adjustable screw is in said pocket in threaded engagement with said head, and a compression spring reacts between said shoe and screw to urge the flat face of said shoe against the flat face of said quill.

7. In a drill press head, the combination with a quill linearly shiftable in said head and a feed shaft for said quill rotatably mounted in said head in positive driving engagement with said quill; of a depth gage rod mounted on said head in positive driven engagement with said feed shaft for linear movement simultaneously with said quill, and stop means adjustably fixed on said rod for abutment with said head after predetermined rotary movement of said shaft for limiting shifting movement of said quill in one direction to an amount determined by said stop means.

8. In a drill press, a drill press head, a quill movable linearly in said head, a spindle rotatably mounted in said quill and movable therewith, a depth-gage rod mounted on said head for movement relative thereto, a drive shaft rotatably mounted in said head in simultaneous positive driving engagement with both said quill and said rod, and adjustable stop means carried by said rod, said stop means being engageable with said head to limit movement, in one direction, of said rod and shaft without exerting any lateral forces on said quill.

9. In a drill press, a drill press head, a quill movable linearly in said head, a spindle rotatably mounted in said quill and movable therewith, a depth-gage rod mounted in said head for movement relative thereto, a drive shaft rotatably mounted in said head in simultaneous positive engagement with both said quill and said road, and adjustable stop means carried by said rod, said stop means being engageable with said head to limit movement, in one direction, of said rod and shaft without exerting an lateral forces on said quill.

10. In a drill press head, a quill movable linearly in said head, a spindle rotatably mounted in said quill and movable therewith, a depth-gage rod linearly movable in said head, a drive shaft rotatably mounted in said head in operative engagement with both said quill and said rod, and adjustable stop means carried by said rod, said stop means being engageable with said head to limit movement, in one direction, of said rod and shaft without exerting any lateral forces on said quill.

11. In a drill press, a drill press head, a quill movable linearly in said head, a spindle rotatably mounted in said quill and movable therewith, a depth-gage rod linearly movable in said head, a drive shaft, said shaft being the sole connection between said quill and said rod, and adjustable stop means carried by said rod, said stop means being engageable with said head to limit movement, in one direction, of said rod and shaft without exerting any lateral forces on said quill.

12. In a drill press, a drill press head, a quill movable linearly in said head, a depth-gage road linearly movable in said head, abutment means on said rod adjustable lengthwise thereof for limiting, in one direction, the movement of said quill, a drive shaft, means for driving said shaft, means operatively connecting said driving means to said rod, and means interconnecting said rod and said quill.

13. In a drill press comprising a frame having a work support and having a quill movable on advance stroke toward the support, said quill containing rotatable means for rotating a drill engageable with the work, the combination of: a depth-gage rod, abutment means on said rod adjustable lengthwise thereof for engaging an abutment of the frame to limit said advance stroke, a drive shaft, means operatively connecting the shaft to the quill for moving the latter on advance stroke when the shaft rotates in one direction of rotation, and for operatively connecting the shaft to said rod for moving said abutment means toward said abutment when the shaft rotates in said direction of rotation.

14. In a drill press, a drill press head, a quill movable linearly in said head, a spindle rotatably mounted in said quill and movable therewith, a depth-gage rod mounted on said head for movement relative thereto, a drive shaft mounted in said head in simultaneous engagement with both said quill and said rod, another drive shaft mounted in said head in driving engagement with said rod, and adjustable stop means carried by said rod, said stop means being engageable with said head to limit movement, in one direction, of said rod and said shafts without exerting any lateral forces on said quill.

15. In a drill press, a drill press head, a tool carrying member linearly movable in said head, a depth-gage rod linearly movable in said head, abutment means on said rod adjustable lengthwise thereof and engageable with said head to limit the movement, in one direction, of said rod, a drive shaft, means connecting said drive shaft to said rod for moving the latter, and other means connecting said drive shaft to said member for actuation thereof.

16. A drill press according to claim 15, wherein said first-mentioned connecting means comprises a rack on said rod and longitudinal splines on said drive shaft engageable with said rack, and said second-mentioned connecting means comprises a rack on said member engageable with said drive shaft splines.

17. A drill press according to claim 15, wherein said first-mentioned connecting means comprises a rack on said rod and longitudinal splines on said drive shaft engageable with said rack, and said second-mentioned connecting means comprises another shaft in splined engagement with said rack, said other shaft also being in splined engagement with said member.

18. In a machine tool: a head; a tool carrying member movable linearly in said head; a tool mounted on said member and movable therewith; a rod mounted in said head for movement relative thereto; abutment means carried by the rod for limiting, in one direction, movement of the member; and driving means having independent connection to said member and said rod, respectively, for applying only vertical forces thereto.

19. In a machine tool: a head; a tool carrying member movable linearly in said head; a tool mounted on said member and movable therewith; a rod mounted in said head for movement relative thereto; abutment means carried by the rod for limiting, in one direction, movement of the member; and means for driving said member, as least a portion of said means being operative to drive said rod independently of said member.

References Cited in the file of this patent
UNITED STATES PATENTS
2,525,805    Kirkpatrick _____ Oct. 17, 1950